US011468431B2

(12) United States Patent
Williams et al.

(10) Patent No.: US 11,468,431 B2
(45) Date of Patent: Oct. 11, 2022

(54) SYSTEM AND METHOD FOR AUTHORIZING BLOCKCHAIN NETWORK TRANSACTIONS

(71) Applicant: Forte Labs, Inc., South San Francisco, CA (US)

(72) Inventors: Josh Williams, San Francisco, CA (US); Raymond A. Chiapuzio, Eugene, OR (US); Michael B. Li, San Francisco, CA (US)

(73) Assignee: FORTE LABS, INC., South San Francisco, CA (US)

( * ) Notice: Subject to any disclaimer, the term of this patent is extended or adjusted under 35 U.S.C. 154(b) by 0 days.

(21) Appl. No.: 16/685,026

(22) Filed: Nov. 15, 2019

(65) Prior Publication Data

US 2020/0160320 A1      May 21, 2020

Related U.S. Application Data

(60) Provisional application No. 62/769,691, filed on Nov. 20, 2018.

(51) Int. Cl.
*G06Q 20/36*      (2012.01)
*A63F 13/798*      (2014.01)
(Continued)

(52) U.S. Cl.
CPC .......... *G06Q 20/36* (2013.01); *A63F 13/798* (2014.09); *H04L 9/0637* (2013.01); *H04L 9/50* (2022.05); *H04L 2209/56* (2013.01)

(58) Field of Classification Search
CPC ........ G06Q 20/36; G06Q 20/40; G06Q 20/02; G06Q 2220/00; A63F 13/798;
(Continued)

(56) References Cited

U.S. PATENT DOCUMENTS 10,320,569 B1 *   6/2019   Wentz et al. ......... H04L 9/3247
10,404,471 B1 *   9/2019   Griffin et al. ........... H04L 29/06
(Continued)

OTHER PUBLICATIONS

Katalyse.io, What are Sidechains and Childchains?, Aug. 23, 2018, HackerNoon, hackernoon.com, pp. 1-7. (Year: 2018).*

*Primary Examiner* — Mohammad Z Shaikh
*Assistant Examiner* — George N. Proios
(74) *Attorney, Agent, or Firm* — Hamilton, Brook, Smith & Reynolds, P.C.

(57) ABSTRACT

Systems and methods are provided that authorize blockchain network transactions based on a work requirement. A blockchain network has a plurality of nodes. At least one node of the plurality of nodes is configured to determine whether a token has satisfied a work requirement. The work requirement represents participation of performing work within the blockchain network. The at least one node is further configured to approve a transaction as a function of determining that the work requirement has been satisfied and, to disapprove the transaction as a function of determining that the work requirement has not been satisfied. By enabling the transaction to be approved based on a work requirement, the token, for example, can be authenticated as having an inherent functional value. In this way, the blockchain network or token exchange can attest to the token not being a security, which would be subject to federal securities and regulations.

15 Claims, 5 Drawing Sheets

(51) Int. Cl.
*H04L 9/06* (2006.01)
*H04L 9/00* (2022.01)

(58) Field of Classification Search
CPC .................. A63F 13/795; A63F 13/792; A63F 2300/575; H04L 9/0637; H04L 2209/56; H04L 2209/38; H04L 9/0897; H04L 9/3239
USPC .......................................................... 705/41
See application file for complete search history.

(56) References Cited

U.S. PATENT DOCUMENTS

| | | | |
|---|---|---|---|
| 10,537,807 B2 * | 1/2020 | Farudi et al. .......... | A63B 71/06 |
| 10,579,974 B1 * | 3/2020 | Reed ....................... | G06Q 20/10 |
| 10,581,847 B1 * | 3/2020 | Sun et al. ............... | H04L 29/06 |
| 10,742,398 B2 * | 8/2020 | Rosenoer et al. ........ | H04L 9/06 |
| 10,751,628 B2 * | 8/2020 | Packin et al. ......... | A63F 13/792 |
| 2018/0349201 A1 * | 12/2018 | Clark ........................ | G06F 9/50 |
| 2019/0051390 A1 | 2/2019 | Shah ....................... | G16H 10/60 |
| 2019/0158275 A1 * | 5/2019 | Beck ........................ | H04L 9/06 |
| 2019/0304012 A1 * | 10/2019 | Ramirez et al. ....... | G06Q 40/02 |
| 2019/0366475 A1 * | 12/2019 | Scarselli et al. ....... | B23K 26/00 |
| 2019/0370788 A1 * | 12/2019 | Aronson ................ | G06Q 20/36 |
| 2020/0038761 A1 * | 2/2020 | Packin et al. ......... | A63F 13/792 |
| 2020/0143405 A1 * | 5/2020 | Tucker ................... | G06Q 30/02 |
| 2020/0184431 A1 * | 6/2020 | Sinmao et al. ......... | G06Q 20/06 |
| 2021/0110360 A1 | 4/2021 | Williams et al. | |
| 2021/0133700 A1 | 5/2021 | Williams et al. | |

\* cited by examiner

SYSTEM AND METHOD FOR AUTHORIZING BLOCKCHAIN NETWORK TRANSACTIONS

RELATED APPLICATION

This application claims the benefit of U.S. Provisional Application No. 62/769,691, filed on Nov. 20, 2018. The entire teachings of the above application are incorporated herein by reference.

BACKGROUND

A blockchain is a peer-to-peer, electronic ledger which is implemented as a computer-based decentralized, distributed computer-implemented system made up of blocks which in turn are made up of transactions. Each transaction is a data structure that encodes the transfer of control of a digital asset between participants in the blockchain computer-implemented system, and includes at least one input and at least one output. Each block contains a hash of the previous block so that blocks become chained together to create a permanent, unalterable record of all transactions which have been written to the blockchain since its inception. Transactions contain small programs, known as scripts, embedded into their inputs and outputs, which specify how and by whom the outputs of the transactions can be accessed.

For a transaction to be written to the blockchain, it must be "validated." Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it should be i) validated by the first node that receives the transaction—if the transaction is validated, the node relays it to the other nodes in the network; and ii) added to a new block built by a miner; and iii) mined, i.e., added to the public ledger of past transactions.

Blockchain may be used for the implementation of "smart contracts." These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results. In respect of commercial transactions, for example, these may involve the transfer of property rights and/or assets. Such assets may include real property, personal property including both tangible and intangible property), digital assets such as software, for example, or any other type of asset. In the digital economy, there is often an expectation that exchanges and transfers will be performed in a timely manner and across vast distances. This expectation, along with practical, technical limitations, mean that traditional forms of asset transfer, such as physical delivery of hardcopy of documents representing a contract, negotiable instrument, etc., or the tangible asset itself, is not desirable. Thus, smart contracts can provide enhanced control, efficiency, and speed of transfer.

An area of blockchain-related interest is the use of "tokens" to represent and transfer assets via the blockchain. A token thus serves as an identifier that allows the real-world item to be referenced from the blockchain. Through an Initial Coin Offering (ICO) model, startups can raise capital by issuing tokens on a blockchain, such as Ethereum, and distributing them to token buyers in exchange for making a financial contribution to a project. These tokens, which can be transferred across a network and traded on cryptocurrency exchanges, can serve a multitude of different functions, from granting holders access to a service to entitling them to company dividends. Depending on their function, tokens may be classified as security tokens or utility tokens.

Tokens may be used, for example in an initial public offering (IPO) to issue company shares, dividends, and voting rights over blockchain networks. The tokens may include security tokens and utility tokens. The security tokens may be associated with a value that is derived from a tradable asset and, thus, may be deemed a security token that may be subject to federal laws regulating traditional securities. In contrast, the utility tokens may represent future access to a company's product or service. A defining characteristic of the utility token is that it is not designed as an investment. Since a utility token is not issued in the form of an investment asset, it may be exempt from having to comply with federal legislation regulating securities.

SUMMARY

According to an example embodiment, a system for authorizing blockchain network transactions may comprise a blockchain network with a plurality of nodes. At least one node of the plurality of nodes may be configured to determine whether a user has satisfied a work requirement. The work requirement may represent participation of the user within the blockchain network. The at least one node may be further configured to approve a transaction by the user as a function of determining that the user has satisfied the work requirement and to disapprove the transaction as a function of determining that the user has not satisfied the work requirement.

The at least one node may be further configured to employ a smart contract to determine whether the user or a token has satisfied the work requirement. The token may be a utility token or non-fungible token.

According to an example embodiment, the for authorizing blockchain network transactions may include at least one node that is configured to determine whether a token has satisfied a work requirement. The token work requirement may represent participation of the token within the blockchain network. The at least one node may be further configured to approve a transaction as a function of determining that the token has satisfied the work requirement and to disapprove the transaction as a function of determining that the token has not satisfied the work requirement.

The system may further comprise a memory. The memory may be configured to store a digital wallet associated with the user. To determine whether the work requirement has been satisfied, the at least one node may be further configured to determine whether the token or user has met at least one criterion for satisfying the work requirement based on data of the digital wallet.

The at least one node may be further configured to employ a smart contract to determine whether the token or user has met the at least one criterion.

The token may be further configured to employ a smart contract to determine whether the token or user has met the at least one criterion.

The at least one criterion may include a minimum number of utility tokens. The data may include a usage number of utility tokens used by the user within the blockchain network. The at least one node may be further configured to compare the usage number to the minimum number to determine whether the user or token has met a given criterion of the at least one criterion.

The system may further comprise a memory, the memory configured to store a digital wallet associated with the user. To determine whether the user has satisfied the work requirement, the at least one node may be further configured to identify at least one attestation stored on the blockchain network, the at least one attestation associated with the digital wallet.

The at least one node may be further configured to employ a smart contract to identify the at least one attestation.

The at least one attestation may include an anti-money laundering (AML) type attestation or a know your customer (KYC) security type attestation.

The at least one attestation may attest to an amount of time spent, by the user, streaming digital content over the blockchain network.

The at least one attestation may attest to an amount of time spent, by the smart contracts associated with the token, streaming digital content over the blockchain network.

The transaction may be for a utility token.

The utility token may be associated with at least one consumptive use within the blockchain network, the at least one consumptive use for encouraging the user to deplete a token balance associated with the utility token.

The utility token may be a fungible token and the at least one consumptive use may include using the fungible token to purchase a non-fungible tokenized digital asset.

The utility token may be a fungible token and the at least one consumptive use may include donating the fungible token.

The utility token may be a fungible token and the at least one consumptive use may include using the fungible token to increase, maintain, or enhance a level associated with a non-fungible tokenized digital asset.

The utility token may be a fungible token and the at least one consumptive use may include using the fungible token to mint a new non-fungible tokenized digital asset.

The transaction may be authorized in an event the at least one node approves the transaction and the transaction may be denied in an event the at least one node disapproves the transaction.

The at least one node may be one of multiple nodes of the plurality of nodes configured to approve or disapprove the transaction and the transaction may be authorized based on approvals from the multiple nodes that conform with a multisignature approval structure.

The system may further comprise a memory configured to store a digital wallet owned by the user and the transaction may include transfer of ownership of the digital wallet from the user to another user.

In an event the at least one node determines that the user has satisfied the work requirement, the at least one node may be further configured to unlock use of one or more utility tokens by the user.

The transaction may be a multi-sided transaction.

The participation may include participation in a blockchain-based game.

The blockchain-based game may be between at least one influencer and at least one fan of the at least one influencer, the user having a role of fan or influencer in the blockchain-based game.

The blockchain-based game may include a utility token and the participation may include engaging with the at least one influencer in the blockchain-based game to earn a non-fungible token associated with the at least one influencer.

The blockchain-based game may include a utility token and the at least one node may be further configured to determine that the user has satisfied the work requirement based on a level of a user account of the user having achieved a participation level, the participation level achieved via use of the utility token by the user in the blockchain-based game.

The blockchain-based game may include a utility token and the transaction may include activation or trade of the utility token.

The participation may include participation while the user is in possession of a utility token.

The participation may include referencing at least one address that identifies a network resource accessible by the user via the blockchain network.

Alternative computer-implemented method embodiments parallel those described above in connection with the example system embodiments.

It should be understood that example embodiments disclosed herein can be implemented in the form of a method, apparatus, computer-implemented system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

It should be understood that the term "blockchain" as used herein includes all forms of electronic, computer-based, distributed ledgers. These include consensus-based blockchain and transaction-chain technologies, permissioned and un-permissioned ledgers, shared ledgers and variations thereof. While Bitcoin and Ethereum may be referred to herein for the purpose of convenience and illustration, it should be noted that the disclosure is not limited to use with the Bitcoin or Ethereum blockchains and alternative blockchain implementations and protocols fall within the scope of the present disclosure.

Figure 1A:
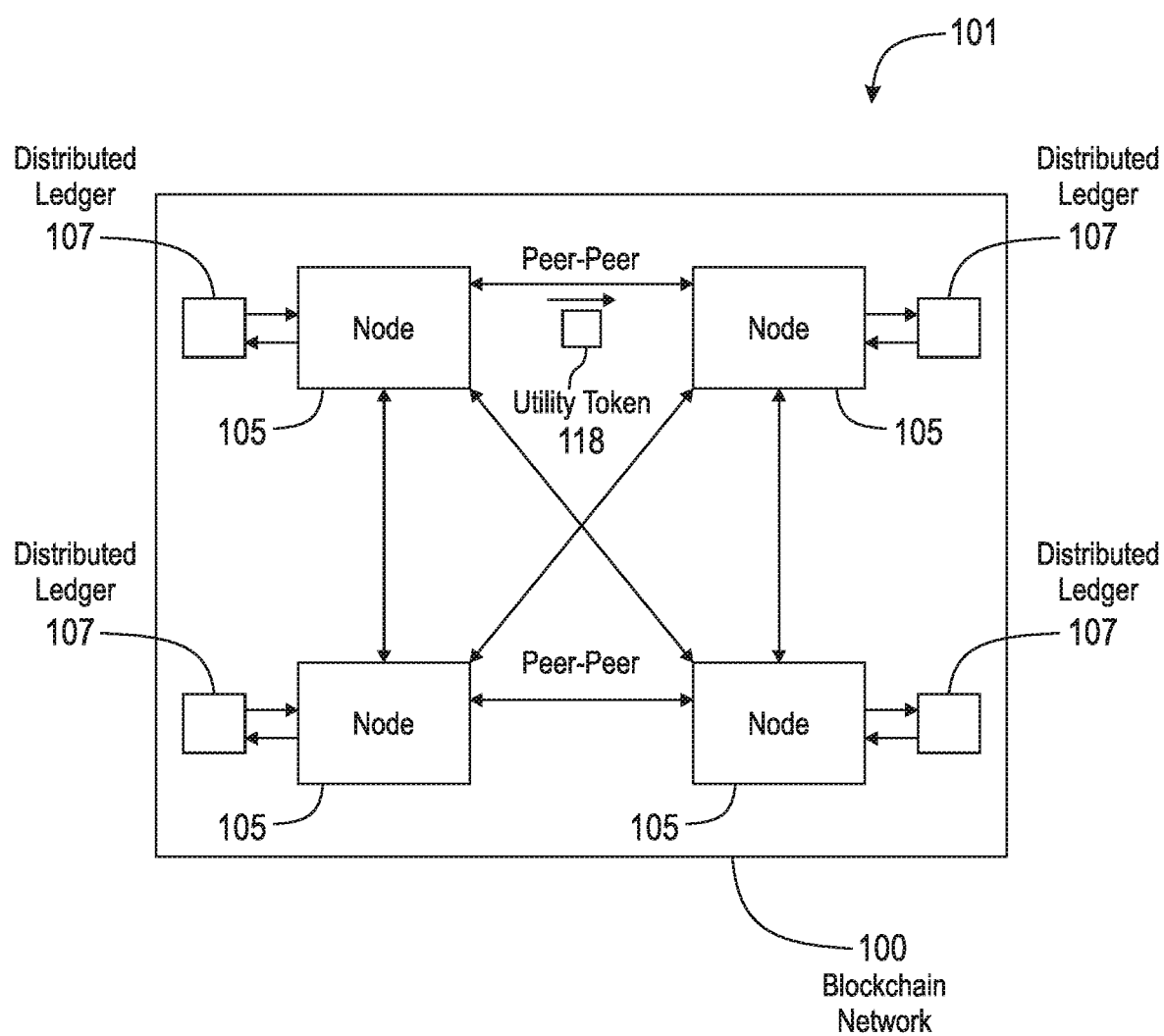
FIG. 1A is a block diagram of an example embodiment of a system for authorizing blockchain network transactions.

FIG. 1A is a block diagram of an example embodiment of a system 101 for authorizing blockchain network transactions. The system 101 comprises a blockchain network 100 with a plurality of nodes 105. At least one node of the plurality of nodes 105 may be configured to determine whether a user (not shown) has satisfied a work requirement. In another example, it may be determined whether the token has completed a work requirement. The work requirement may represent participation of the user or token within the blockchain network 100. The at least one node may be further configured to approve a transaction, such as an exchange of the utility token 118, by the user as a function of determining that the user has satisfied the work requirement and to disapprove the transaction as a function of determining that the user has not satisfied the work requirement. It should be understood that a number of nodes, arrangement of nodes, and number of tokens shown in FIG. 1A are for illustrative purpose and that the system 101 is not limited to the number of nodes, arrangement of nodes, or number of tokens shown.

In general, blockchain is a write-once, append-many electronic ledger. Blockchain is an architecture that allows disparate users to make transactions and creates an unchangeable record of those transactions. In order to move anything of value over any kind of blockchain, a network of nodes must first agree that a corresponding transaction is valid. As a peer-to-peer network, combined with a distributed time-stamping server, blockchain ledgers can be managed autonomously to exchange information between disparate parties; there's no need for an administrator. In effect, the blockchain users are the administrator. Additionally, blockchain networks can be used for "smart contracts," scripts that automatically execute when certain conditions are met. For example, a smart contract may be employed to determine whether pre-determined conditions are met that prove someone owns a cryptocurrency and has authority to send money they claim to own. Smart contracts have numerous uses and may require more than one set of inputs to trigger a transaction. The at least one node may be further configured to employ a smart contract to determine whether the user has satisfied the work requirement. The smart contracts may be written in any suitable programming language, such as the programming language "Solidity" on the basis of If-This-Then-That (IFTTT) logic.

The system 101 may further comprise a memory (not shown). The memory may be configured to store a digital wallet (not shown) associated with the user. To determine whether the user has satisfied the work requirement, the at least one node may be further configured to determine whether the user has met at least one criterion for satisfying the work requirement based on data of the digital wallet. The at least one node may be further configured to employ a smart contract to determine whether the user has met the at least one criterion.

According to an example embodiment, the utility token 118 may be created, stored in the digital wallet, recorded on a distributed ledger 107, and exchanged. According to an example embodiment, an exchange of the utility token 118 may be recorded on the blockchain network 100, that is, recorded on the distributed ledger 107. Such recordation may serve as an attestation that enables a determination of whether the user has satisfied the work requirement.

The at least one criterion may include a minimum number of utility tokens. The data may include a usage number of utility tokens used by the user within the blockchain network. The at least one node may be further configured to compare the usage number to the minimum number to determine whether the user has met a given criterion of the at least one criterion.

In contrast to security tokens, utility tokens may provide access to a specific application or service (which can be decentralized) or the right to contribute work within a community-owned network. For example, utility tokens may provide their holders with future access to a startup's services or products. This class of tokens, that is, a utility class, may include tokens that primarily exist as accessibility elements on blockchains that they represent, such as the Starcoin utility token, disclosed further below. Utility tokens serve a useful function and, if associated with a value, the value of the utility token is fixed whereas a security token, serving as an investment, may derive its value from an external, tradable asset. In contrast, a token that derives its value from an external, tradable asset may be classified as a security token and become subject to federal securities regulations.

A utility token may represent a software license or any other suitable license that provides permission to do, use, or own something. A utility token may confer a right on a holder to participate in a network in some way. For example, the utility token may give the holder a right to use the network and take advantage of its services to vote on governance of the network and its upgrade. A decentralized token associated with a mobile travel application may give a right to take a ride whereas a protocol token may give a right to vote on a direction of the protocol. Such utility tokens function different from a security token that, in contrast, enables the holder to earn income just by holding.

The main tests that regulators apply when scrutinizing arrangements come from the U.S. Supreme Court case Securities and Exchange Commission (SEC) v. W.J. Howey Co. This 1946 case established a litmus test, known as the "Howey test," for whether an arrangement involved an "investment contract." The case concerned an offer of a land sales and service contract that the court upheld to be an investment contract, that is, a security with the meaning of the Securities Act of 1933. In terms of applying the "Howey test" to tokens on a blockchain, the following three items may need to be true for a digital token to be considered an investment contract, that is, a security token: 1) the digital token represents an investment of money, 2) in a common enterprise or business, and 3) the digital token represents an expectation of profits predominantly from the work of others. As disclosed above, to determine whether the user has satisfied the work requirement, the at least one node may be further configured to determine whether the user has met at least one criterion for satisfying the work requirement and satisfying the work requirement may be met by using a minimum number of utility tokens, that is, tokens that would not be classified as security tokens via the "Howey test."

Turning back to FIG. 1A, the system 101 may further comprise a memory, the memory configured to store a digital wallet (not shown) associated with the user. To determine whether the user has satisfied the work requirement, the at least one node may be further configured to identify at least one attestation (not show) that is stored on the blockchain network. The at least one attestation may be associated with the digital wallet. The at least one node may be further configured to employ a smart contract (not shown) to identify the at least one attestation. The at least one attestation may include an anti-money laundering (AML) type attestation or a know your customer (KYC) security type attestation. The at least one attestation may attest to an amount of time spent, by the user, streaming digital content over the blockchain network 100.

The transaction may be for a utility token, such as the Starcoin utility token, disclosed further below, or any other suitable utility token.

The utility token may be associated with at least one consumptive use within the blockchain network, the at least one consumptive use for encouraging the user to deplete a token balance associated with the utility token, such as the consumptive uses disclosed further below with regard to the Starcoin utility token, or any other suitable consumptive use associated with a utility token.

The utility token may be a fungible token and the at least one consumptive use may include using the fungible token to purchase a non-fungible tokenized digital asset. For example, the utility token may be the Starcoin utility token that is a fungible token that may be used to purchase a non-fungible tokenized digital asset, such as a StarCard pass. A non-fungible token (NFT) may be a special type of cryptographic token which represents something unique.

The utility token may be a fungible token and the at least one consumptive use may include donating the fungible token, such as by donating Starcoin directly to influencers as disclosed further below.

The utility token may be a fungible token and the at least one consumptive use may include using the fungible token to increase, maintain, or enhance a level associated with a non-fungible tokenized digital asset, such as using Starcoin to level up, maintain or enhance StarCards, as disclosed further below.

The utility token may be a fungible token and the at least one consumptive use may include using the fungible token to mint a new non-fungible tokenized digital asset. For example, as disclosed further below, influencers may be enabled to use Starcoin to mint new StarCards.

The transaction may be authorized in an event the at least one node approves the transaction and the transaction may be denied in an event the at least one node disapproves the transaction. The at least one node may be one of multiple nodes of the plurality of nodes configured to approve or disapprove the transaction and the transaction may be authorized based on approvals from the multiple nodes. Such approvals may result in final approval of the transaction in an event that such multiple approvals conform with a multisignature approval structure.

The system 101 may further comprise a memory configured to store a digital wallet owned by the user and the transaction may include transfer of ownership of the digital wallet from the user to another user. For example, a user may be prevented from transferring ownership of the digital wallet until having met the work requirement.

In an event the at least one node determines that the user has satisfied the work requirement, the at least one node may be further configured to unlock use of one or more utility tokens by the user.

The participation may include participation in a blockchain-based game. For example, satisfying the work requirement may be based on multiple ways in which a user can participate in the StarCard blockchain-based game, disclosed further below, or via participation in any other suitable block-chain based game.

The blockchain-based game may be between at least one influencer and at least one fan of the at least one influencer, the user having a role of fan or influencer in the blockchain-based game. For example, as disclosed further below, in the StarCard blockchain-based game, a user has a role of a fan or influencer.

The blockchain-based game may include a utility token and the participation may include engaging with the at least one influencer in the blockchain-based game to earn a non-fungible token associated with the at least one influencer. For example, as disclosed further below, a fan may engage with an influencer in the StarCard blockchain-based game to earn a StarCard digital access pass that may be a non-fungible token associated with the influencer.

The blockchain-based game may include a utility token and the at least one node may be further configured to determine that the user has satisfied the work requirement based on a level of a user account of the user having achieved a participation level, the participation level achieved via use of the utility token by the user in the blockchain-based game. For example, the StarCard blockchain-based game disclosed further below includes the Starcoin utility token. At least one node of the nodes 105 in the blockchain 100 may determine a participation level of a fan or influencer in the StarCard blockchain-based game based on user of the Starcoin utility token in the StarCard game.

The blockchain-based game may include a utility token and the transaction may include activation or trade of the utility token. For example, in the StarCard blockchain-based game, disclosed further below, a transaction may include activation or trade of the Starcoin utility token.

The participation may include participation while the user is in possession of a utility token. For example, participation of the user in the StarCard blockchain-based game, disclosed further below, while the user is in possession of the Starcoin utility token.

The participation may include referencing at least one address that identifies a network resource accessible by the user via the blockchain network.

According to an example embodiment, the blockchain network 100 may be an Ethereum network. Ethereum is a decentralized network of computers with two basic functions, a blockchain that can record transactions and a virtual machine, that is, an Ethereum Virtual Machine (EVM), that can produce smart contracts. Because of these two functions, Ethereum is able to support decentralized applications (DApps). These DApps are built on the existing Ethereum blockchain, piggybacking off of its underlying technology. In return, Ethereum charges developers for the computing power in their network, which can only be paid in Ether, the only inter-platform currency. Depending on its purpose, a DApp may create ERC20 tokens to function as a currency, a share in the company, for points in a loyalty program, or even proof of ownership, for example, of an amount of gold or the deed to a house.

As they relate to the Ethereum network, tokens are digital assets that can represent anything from loyalty points to vouchers and IOUs to actual objects in the physical world. Such tokens may be a smart contract that runs on top of the Ethereum blockchain. The code of the smart contract may be uploaded on the EVM, that may be a universal runtime compiler or browser, to execute the smart contract's code. Once the code is on the EVM, the code may be the same across each Ethereum node to be run to check whether the conditions are met. As such, the token may be associated with a set of code (functions) that describes a behavior of the token and may be associated with a database that tracks who owns how many tokens. If a user or another smart contract within Ethereum sends a message to that token's contract in the form of a "transaction," the code may update its database. Tokens can also be tools, such as in-game items, for interacting with other smart contracts. In contrast to tokens, ether is hard coded into the Ethereum blockchain. Ether is sold and traded as cryptocurrency and it also powers the Ethereum network by allowing users to pay for smart contract transaction fees.

Ethereum has a long history of developed standards. For example, the Ethereum Request for Comment (ERC) issue number 20, that is, ERC20, is a standard that defines a set of six functions that other smart contracts within the Ethereum ecocomputer-implemented system can understand and recognize. ERC20 is a protocol standard and in order to be ERC20 compliant, the functions need to be included in the token's smart contract. ERC20 outlines a specific list of rules that a given Ethereum based token has to deploy, simplifying the process of programming the functions of tokens on Ethereum's blockchain. These include, for instance, how to transfer a token (by the owner or on behalf of the owner) and how to access data (name, symbol, supply, balance) about the token. The ERC20 standard also describes two events—signals that a smart contract can fire and other smart contracts can listen for. Other standards have been proposed based on the ERC20 standard, such as the ERC-223 standard that attempt to improve on the ERC20 standard. For example, ERC-223 adds an additional data parameter to the ERC20 transfer function, to allow for more complex operations than just a token transfer and ERC-777 defines a new set of functions. According to an example embodiment, the utility token 118 may be an ERC20 standard based compliant token.

Figure 1B:
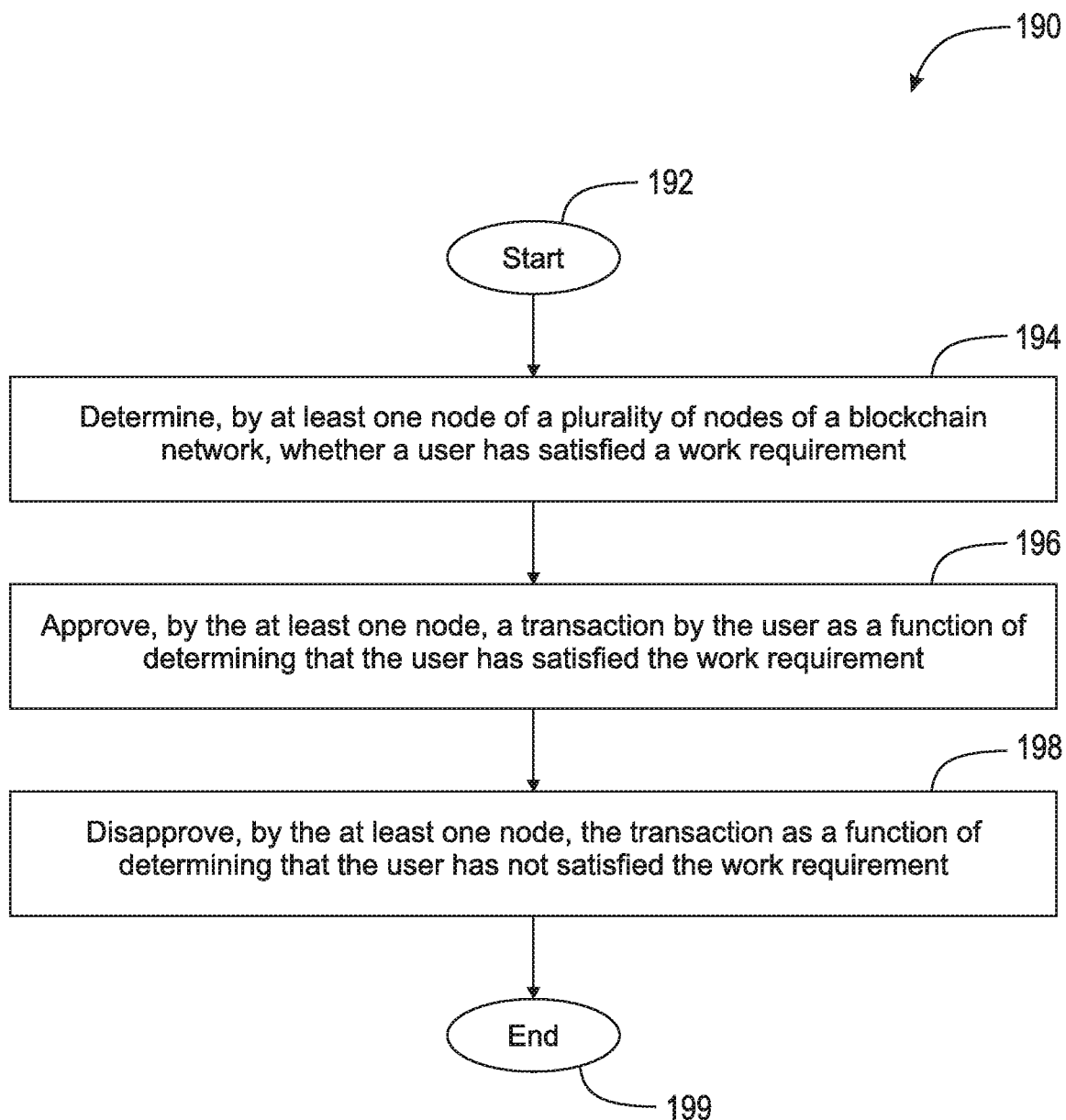
FIG. 1B is a flow diagram of an example embodiment of a computer-implemented method for authorizing blockchain network transactions.

FIG. 1B is a flow diagram 190 of an example embodiment of a computer-implemented method for authorizing blockchain network transactions. the computer-implemented method begins (192) and determines, by at least one node of a plurality of nodes of a blockchain network, whether a user has satisfied a work requirement, the work requirement representing participation of the user within the blockchain network (194). The method approves, by the at least one node, a transaction by the user as a function of determining that the user has satisfied the work requirement (196). The method disapproves, by the at least one node, the transaction as a function of determining that the user has not satisfied the work requirement (198) and the thereafter ends (199) in the example embodiment.

Further details of example embodiments are disclosed below.

When the personal computer industry started to take off, there were all sorts of programs created to take advantage of this useful new platform. Video games for personal computers soon followed, capturing the hearts and minds of consumers, and becoming a primary driver for sales of high end personal computers (PCs), a phenomenon that continues on today. A similar trend has been observed on every major consumer technology platform since. Video games have been, and continue to be, a leading driver of consumer adoption, engagement, retention, and transactions on new platforms from PC to Facebook to mobile. The technology industry is entering another platform sea change with the advent of distributed ledgers and decentralized computing platforms.

Blockchain may represent a next "new" platform for exciting gaming experiences, and engaging games may drive mass market adoption of distributed ledger technologies. According to an example embodiment, a blockchain-based game (referred to interchangeably herein as "Star-Card") is a game built around stars and influencers. StarCard enables an opportunity to empower gamers and to build a true mainstream use of cryptocurrency. To enable StarCard, an example embodiment provides an underlying protocol platform which may be used to power other games. StarCard leverages key features of the blockchain, specifically digital proof of ownership, verifiable scarcity, and non-fungible tokens, to create innovative blockchain gameplay for millions of people to enjoy.

Blockchain Gaming Overview
Opportunity for Blockchain Games

Transaction activity on Ethereum has shown that gaming is already a predominant use case when compared to other categories leveraging the blockchain. While user penetration is still in its early days, upcoming advances in distributed ledger technology, particularly around throughput, latency and transaction costs, as well as innovative new content and applications, will create massive opportunities for the next generation of game companies. Early blockchain games have demonstrated a novel new consumer experience for collectible digital assets. This first generation of games, despite having limited game systems and economy designs, have helped developers and users reimagine what games can be. From the relationship between game developer and player, to the construction of digital game economies, to new governance models for gaming communities, blockchain-based gaming is opening up new possibilities. Developers have new business models at their disposal and new ways to fund and grow their games, while players are offered new digital interaction models and novel gameplay experiences.

Blockchain-Based Digital Goods

A prime use case for blockchain in gaming is related to digital goods. Globally, games today are approaching a $152 billion a year industry (NewZoo). This $152B industry is primarily driven by direct sales of digital goods. However, even greater demand potential is illustrated by games which enable secondary market trading for their digital goods. Games which allow secondary trading among players have demonstrated enormous demand for digital goods with individual items trading for tens of thousands of dollars. Counter-Strike: Global Offensive (CS:GO) is a particularly notable case in which their secondary market dwarfs their primary market. The secondary market for CS:GO virtual skins is estimated at over $5 billion (Narus Advisors), while the company's game sale revenue is estimated at just $250-300 million (Statista), meaning secondary trades drive ~20× the transaction value of direct sales. When accounting for the potential of a secondary market where players can trade amongst themselves, games globally represent a multi-trillion dollar trading volume opportunity. What is perhaps even more impressive is the high level of consumer engagement in light of the severe drawbacks and limitations inherent in distributing digital goods using existing centralized technologies. There are very real issues with regards to cheating, hacking, and developer influence over these digital economies which inevitably hamper user experience.

A blockchain-based approach to digital goods alleviates these issues and promises several key benefits:

1. Transparency—Scarcity can be verifiably audited because assets are defined by a smart contract which is publicly available.

2. True Ownership—Users can verify that they truly own the assets that they purchase, and can just as easily track the ownership of other assets as they change hands. An item cannot be destroyed or nullified even if our company disappears—it will continue to live on in the blockchain.

3. Persistent Value—Unlike traditional centralized games wherein users purchase digital goods while they play a particular game and then have no effective use or value from those goods once they stop playing, blockchain-based games can allow users to sell or trade their digital goods whenever they want. For users and for game designers, decentralized ledgers open up fantastic new possibilities for engaging and transacting with digital goods.

4. Eliminating Fraud/Automatic Provenance—Because the blockchain community verifies each transaction and current owner, counterfeiting and scamming are more difficult. When someone wants to trade an incredibly rare item, the item's legitimacy can be proven. In effect, blockchain creates a significantly more trusted trading environment which greatly enhances peer-to-peer trading capabilities, thereby providing a highly interactive, engaging experience for gainers.

StarCard Game Platform

In mobile gaming, leveraging proprietary intellectual property (IP) or licensed content is a proven strategy employed by many developers. For example, Glu Mobile created a Kim Kardashian game which was downloaded over 40 million times and generated over $150 million of revenue. Other popular mobile games have been built around celebrities such as Katy Perry, Demi Lovato, Eminem, Shakira, and many others. Similarly, StarCard is a game platform that puts stars and influencers front and center. According to an example embodiment, distributed ledger technology is employed to deliver innovative new game experiences around the "fame economy," as well as to tokenize the interactions between fans and influencers. Digital collectibles serve as the base of the platform, coupled with game mechanics, trading capabilities, and novel community interactions.

Unlocking the Fame Economy

While the gaming industry contains rabid fandom and perhaps offers the best target user base to drive the mainstream adoption of a blockchain gaming product, there are still many other influencer ecosystems that would benefit from the use of blockchain. Instagram, for example, has an influencer market that is estimated to reach $2.3 billion by 2019 (XCart), and an audience size of 500 million daily active users. YouTube has tens of millions of content creators with an estimated 40,000 creators earning enough to do it full-time, and an audience size of 1.5 billion monthly active users. Similar economic statistics can be found on many major social platforms around the world. And, aside from earning social media advertising dollars, many influencers rely on earnings from platforms, such as Patreon, that collect hundreds of millions of dollars in donations. Patreon, like other influencer-to-fan engagement platforms, helps create more vibrant connections within these fame economies. Whether they be eSports athletes, content creators, live streamers, traditional athletes, or A-list celebrities, all influencers want more effective ways to grow, engage, and monetize their audiences.

An example embodiment employs blockchain for influencer-to-fan interactions, and StarCard addresses the needs of this market. According to an example embodiment, a protocol layer is created for StarCard that enables influencers to create lightweight games around themselves in a sustainable and scalable way.

Protocol Overview

According to an example embodiment, a new digital interaction game model between fans and influencers is created. Today, fans want to be able to access and interact with their favorite influencers in new and interesting ways. On the other hand, influencers want novel ways to leverage their brand as well as grow, engage and monetize their audience. The StarCard protocol is designed to allow for the creation of engaging games and economies which enable rich and rewarding interactions between and among fans and influencers.

Building a system that balances the needs of fans and influencers is complicated and the integrity of the system is paramount. The interplay between the various components and the overall economy design and management is fundamental to providing a positive user experience for everyone involved. To that end, an example embodiment builds a fame economy protocol utilizing non-fungible tokenized digital assets that have a variety of useful features and services attached to them. According to an example embodiment, the economy also features a fungible token which can be used to acquire as well as interact with the broader economy in interesting ways.

The protocol is based on the four components outlined below:

1. Non-Fungible Crypto-Asset Configuration
   Configurable features and benefits for crypto-asset holders
   Asset tiering parameters—asset levels, rarities, special sets, seasons, etc
   Visual customization of crypto-asset
   Itemization—attachment of items, objects or functionalities to crypto-assets
   Contract Terms/Requirements for influencer
2. Fungible Token Mechanics (Starcoin)
   Mechanics for purchasing non-fungible crypto-assets
   Mechanics for purchasing items that affect non-fungible crypto-assets
   Mechanics for increasing influencer visibility/reputation in the network
   Transaction split dynamics associated with trading, crowdfunding, donating and micro-transactions
   Community-based rewards and incentives
   Mechanics for direct interactions between tokens and crypto-assets
3. Economy Design and Management
   Parameters around number of non-fungible digital assets per influencer
   Mechanisms for token supply management and general economy management
   Generation of new non-fungible crypto-assets
   Management of consumable items, boosters, or card level-up mechanics
   Interaction dynamics between various asset tiers
   Game mechanics such as "earning" assets based on work put into the network
4. Clearinghouse Architecture
   Highly efficient processing of fungible and non-fungible crypto-asset transactions
   Mechanism for proving transactions via state channels between users rather than between wallets, which enables users to prove their work and participation in the network. The unique interplay between these four components allows for the creation of tokenized influencer economies built in a sustainable and scalable way.

Protocol Use

An example embodiment of use of the protocol is to create a platform that enables influencers to create lightweight games around themselves utilizing digital collectibles. This use case represents an entirely new digital interaction model between fan and influencer. StarCard includes non-fungible blockchain assets called StarCards which are supported by fungible tokens called Starcoin.

StarCards

StarCards are digital access passes of varying rarities and characteristics where ownership entitles the owner to special access to influencers. Influencers are enabled to use the protocol to create their own digital collectible economies to draw in new fans, deepen engagement, and better monetize their brand. Fans are enabled to receive special privileges and benefits associated with StarCards and to buy, sell, and trade cards with other fans in the network marketplace.

Starcoin (STR)

Starcoin is an example embodiment of a network token that is closely coupled with StarCards and is a key product offering in and of itself. Aside from using Starcoin to purchase StarCards, Starcoin can also be used for a variety of other consumptive uses within the network. Fans will be able to use Starcoin to level up, maintain or enhance StarCards, to purchase consumable items and cosmetics that affect StarCards, or to donate Starcoin directly to influencers. Influencers are enabled to use Starcoin to mint new StarCards as well as increase their visibility or reputation within the network marketplace.

Token Use

Why is a Network Token Necessary?

According to an example embodiment, a sidechain technology may be used to power the StarCard protocol and Starcoin. There are three key reasons why it is useful to issue a proprietary network token:

1. Scalability and Multisided Micro-Transactions

According to an example embodiment, the network features a high velocity transaction model between multiple parties, and in particular, the multisided nature of a single transaction makes it impossible to employ fiat or Ether. Extremely small transactions, for example, would make the transaction fees associated with fiat and Ether untenable. Additionally, the transaction model may employ smart contract functionality, the low latency and high throughput that the network requires is unachievable on Ethereum today. Thus, according to an example embodiment, StarCard and Starcoin contracts are designed to interact with sidechain child ledgers as well as a network Clearinghouse functionality (see Technical Considerations below).

2. Economy Integrity

Issuing a proprietary network token allows for the encapsulation of the entire StarCard economy into a single medium of value. Currencies such as Bitcoin, Ether, or EOS, on the other hand, are susceptible to exogenous events unrelated to the StarCard network. Additionally, no substantial fees may be charged in the network, thereby enabling an entirely new kind of marketplace model. This model prioritizes network growth instead of taking fees for transactions and creates better long-term incentives and alignment between parties.

3. Token as a Game Mechanic

Due to the network's low transaction costs and rapid transaction settlement, Starcoin itself has unique game-like functionality. According to an example embodiment, there are a number of unique uses of Starcoin beyond the purchasing of StarCards. For example, users can purchase in-game items or donate/tip Starcoin to influencers based on a corresponding dynamic with StarCards. Additionally, influencers can use Starcoin to boost their visibility in the network marketplace as well as to mint new StarCards.

Token Uses and Utility

Starcoin, as a utility token, has many consumptive uses in the network which may be reinforced by an example embodiment of the technology platform.

Consumptive Uses

Outside of redeeming Starcoin for StarCards, there are many consumptive uses that encourage users to deplete their Starcoin balances within the network. Use cases:

Purchases—Virtual goods, emojis and various chat features

Micro-payments for Content—Donations

Status—Increasing visibility or reputation within the network

Access—Leveling up, maintaining, or enhancing StarCards

Earn and Spend—Using Starcoin to mint new StarCards

Clearinghouse Architecture

According to an example embodiment of a proprietary technology infrastructure (referred to interchangeably herein as a "Clearinghouse Architecture" or, simply, "Clearinghouse") is designed to encourage users to use Starcoin in the network for their intended use as well as for performing work on Starcoin itself. The Clearinghouse is designed to (1) speed transaction settlement, such that viewers and fans that want access to benefits provided by StarCards or Starcoin can make purchases and gain access as quickly as possible, (2) provide increased security through rich transaction state information and user account information, and (3) encourage use of Starcoin and StarCards in the StarCard network.

Work on Starcoin

Utilizing the Clearinghouse architecture, users will be able to activate and trade Starcoin only after crossing pre-determined thresholds of "work" in the network. This includes engaging with the influencers to earn an entry level StarCard, or leveling up a user account to a certain level by gaining experience points (the equivalent of utilizing Starcoin for one of its many uses within the network). These thresholds reinforce the intended use of Starcoin in the network and greatly disincentivize speculation as those that buy and hold will not be able to realize passive appreciation in the Starcoin.

Technical Considerations

Scalability, Security, and Storage capacity are areas for which development and innovation is useful for enabling distributed ledger technologies to support mass market adoption of blockchain.

Scalability

Publicly available and widely adopted distributed ledgers, such as Ethereum, face scaling challenges in three major categories: Throughput, Latency and Cost.

1. Throughput—the total network capacity to process transactions in a given period of time. Typical measures of throughput include transactions per second and total transactions per day.

2. Latency—the time required for a single transaction to progress from initiation to full closure and validation in the ledger. Typical measures of latency include mean, median, and maximum transaction completion time over a given period.

3. Cost—includes transaction and validation fees, and, in the case of smart contracts, code hosting and instruction processing fees. Typical measures of cost include mean, median and maximum cost per transaction within a given period of time.

Improvement in all three aspects of transaction scalability are useful for mass market use cases, such as games, on distributed ledgers to proliferate.

Throughput

As of June 2018, the Ethereum network was conducting approximately 800,000 transactions per day on average (Etherscan). This translates to less than 10 transactions per second. By contrast, Visa's payment network handles an average of 150 million transactions per day and is capable of handling upwards of 24,000 transactions per second.

Latency

Transaction latency on Ethereum can vary dramatically based on factors such as gas limit on a transaction or proximity to nodes. Regardless, transaction times typically range from just under a minute to several minutes. However, during times of heavy network congestion it is possible for transactions to get stuck in queue or fail entirely. This is best exemplified by the explosive popularity of CryptoKitties in December 2017. At its peak, CryptoKitties had the busiest address on the Ethereum network, consuming roughly 20-30% of all transactions, and causing the transaction backlog to increase from a couple thousand pending transactions to roughly 30,000. The developer behind CryptoKitties had to increase their transaction fees in order to keep the game running by incentivizing miners to pick up the Company's transactions ahead of others. Naturally, parties who did not increase their transaction fee experienced extremely long delays or failed to post transactions entirely.

Cost

Throughout 2018, transaction fees on Ethereum have typically ranged from $0.20 to $0.80 on a USD denominated basis (Etherscan). However, during times of duress transaction fees can spike as they did in January 2018 when the average fee jumped up to $4.15. While perhaps tenable for large onetime transaction, Ethereum's current transaction fee levels are not viable for applications with high velocity transactions or micro-transactions.

Considering these scalability figures overall, current public ledgers, such as Ethereum, would buckle under the demands for a mass market game. CryptoKitties tested all of these constraints during its peak. At that time, Ethereum's total network throughput was exceeded, resulting in increased transaction times (or failed transactions) as well as higher transaction costs. Transaction queues filled faster than could be cleared and a backlog ensued.

All of this backlog was driven by an estimated usage base of just 14,000 peak users. While CryptoKitties make use of blockchain technology, user interactivity within it is very limited when compared to traditional games. CryptoKitties' users simply breed and market cats, whereas typical games involve complex interactions both with the game service and with other players, often with real-time, sub-second latency expectations.

Successful centralized games today attract millions or tens of millions of daily active users. These users each can interact with the game service hundreds or thousands of times per day on average, earning virtual goods, spending virtual goods, changing the state of their attributes, and engaging in trade and commerce. A single game can, therefore, process billions of user interactions per day, with sub-second end-to-end latency even over cellular networks, at an operating cost of fractions of a cent per transaction.

Clearly, there is a wide gap between the current state of publicly available distributed ledger technology and the needs of mass market applications, especially highly interactive applications, such as games. Yet, there is tremendous opportunity in bringing a truly peer-to-peer economy to games leveraging blockchain technology.

Technological solutions for scaling are desperately needed to address this gap. Scaling solutions, including Casper, Sharding and Plasma, are further detailed below:

Ethereum Casper

Casper proposes a change in consensus method from Proof of Work to Proof of Stake. While controversial, the community is progressing quickly as Proof of Stake enables much faster consensus gathering between nodes and will increase the speed of the network overall. Casper should dramatically reduce the amount of power and computation required to form a Byzantine Fault Tolerant consensus and will also allow for randomization and adjustability of the Byzantine Fault Tolerance on the fly. Moreover, Ethereum Casper is progressing rapidly to address concerns regarding potential centralization of consensus via Delegated Proof of Stake and regarding potential attacks like nothing-at-stake problems.

Ethereum Sharding

Ethereum Sharding refactors how Ethereum currently works to process transactions. Instead of having the whole network process every transaction as it currently does, Sharding instead breaks up the network into discrete pieces ("shards") in much the same way traditional centralized database sharding works. This has the effect of reducing the number of transactions being processed and the number of consensus participants within each shard on the network, thus, speeding up the entire network. Sharding has the potential to massively increase network speed (~10-100x) while also retaining similar security, decentralization and privacy guarantees.

Sharding has some drawbacks as well. Aside from creating additional complexity for developers, it also lowers the percentage needed for attackers to attack the network (to ~30%-40%). Additionally, it is not yet clear how sharding will be managed as it could be easy for certain shards to become overloaded, contaminated or abandoned. Depending on the exact mechanisms used to determine which transactions and/or validators end up in which shard, there are various ramifications possible from a security and validity perspective. Due in part to these issues, the rollout of Sharding on Ethereum is planned conservatively, starting with a staged approach in order to ensure as much as security and time to adapt to potential problems as possible. Consequently, Sharding may not be fully deployed for some time and the potential increase in throughput it provides may not be available in the immediate future on the public Ethereum mainchain.

Ethereum Plasma

Plasma is an in-development blockchain scalability solution. Much in the same way that payment and state channels can be used to process transactions off-chain between agreed parties, Plasma enables off-chain transaction processing. With Plasma, sidechains (sometimes also called child chains) are created to facilitate inter-party transactions off a mainchain. These sidechains are full Ethereum compliant distributed ledgers and transactions conducted on the sidechains with Plasma can be net-settled to the mainchain either when an individual party requests it, or at periodic intervals automatically. Plasma adds the method of running an Ethereum Virtual Machine (EVM) on participant sidechain nodes, and also introduces n-tier child chains, thus, creating a tree of blockchains, each of which can be net-settled to their respective parent chains. Smart contracts allow users to withdraw and deposit funds easily into and out of Plasma sidechains, effectively allowing them to flow in and out of the sidechain at will. Plasma introduces a scaling solution that could enable Ethereum to reach many more transactions per second than currently possible. While Plasma is promising, it is in development. It also has less security and reliability than the mainchain as there is significant complexity and possible security vulnerabilities regarding exit and settlement procedures being worked on actively.

According to an example embodiment of StarCard, StarCard may:

Leverage Ethereum Plasma as it progresses in order to enable child-chains which sync with the Ethereum public chain and design Plasma usage such that the network can maintain ongoing compatibility with core Plasma development as much as possible over time.

Use Ethereum Casper as soon as it is proven in the field and maintain compatibility with Ethereum Casper as it is rolled out to the Ethereum public chain in the future. In the meantime, an example embodiment of StarCard may rely on Proof of Authority for consensus on the sidechain, increasing transaction throughput, while decreasing latency and cost.

Combining these in-development solutions, over time as community releases occur and are adopted by the Ethereum community, StarCard may benefit from orders of magnitude increases in throughput, and dramatic decreases in latency and transaction costs. According to an example embodiment, StarCard may also leverage sidechains, further enhancing scalability. StarCard child chain transactions may be anchored to the public Ethereum chain frequently, with an initial target of daily transaction syncs.

According to an example embodiment, an implementation of StarCard may be designed to achieve: 1) thousands of transactions per second, scaling up from there as the userbase grows, 2) median latency of less than 3 seconds per transaction, and 3) transaction costs at a fraction of a cent (USD) on sidechains, and at a cost per user per day of cents (USD) when anchoring to the main Ethereum chain.

Scalability is an important component in driving true mass market adoption of blockchain technologies. However, addressing Security and Storage is also useful.

Security

Mass market use cases like games rely on a high degree of security. If end users store assets that they truly care about and value on blockchains, then it is useful for them to know that their asset ownership is secure, that transactions on the blockchain are secure, and that the application logic governing their interactions with decentralized services is secure.

Blockchains like Ethereum provide a very high degree of both asset ownership security using private keys and Zero Knowledge Proofs, as well as transaction security through transaction consensus methods with a high degree of Byzantine Fault Tolerance. However, decentralized Smart Contract logic processing on blockchains, such as Ethereum, has suffered many security breaches and continues to suffer from fundamental security flaws.

In 2016, the DAO hack occurred due to a code vulnerability causing 3.6 million Ether to be stolen. This led to part of the Ethereum community wanting to "turn back the clock," which resulted in a hard fork and the creation of Ethereum Classic. There have been many other attacks as well, typically due to smart contract vulnerabilities, such as the series of attacks on Parity. The Parity freeze occurred when a user accidentally triggered a bug in the smart contract, freezing more than 500,000 Ether, and just a few months before that Parity's multi-sig wallet was the target of a hack where 150,000 Ether was stolen from user accounts. While these are some of the more famous incidents, there is a long list of other hacks and security breaches.

Many smart contract security flaws involve classic security issues. For example, reentrancy attacks, wherein asynchronous functions fail to safely handle state in the face of repeated out of order function calls, have occurred repeatedly in Smart Contracts, including the DAO hack. Integer overflow and underflow attacks have also been used repeatedly to misappropriate transfers, causing much larger than intended transfers or much smaller than intended payments. Similarly, integer overflow and underflow attacks have been used to negate control flow protections and cause unintended jumps in the instruction table. The Ethereum Virtual Machine (EVM) and Solidity do not proactively prevent overflow or underflow attacks, instead relying on contract implementers to use libraries like SafeMath and to perform under/overflow checks manually. Nor does the EVM strongly enough restrict instruction jumps and state assertions upon reentrancy.

Because of this, Web Assembly, otherwise known as WASM, is being ported to Ethereum. WASM incorporates several much stronger security fundamentals than the EVM. These security fundamentals include:
  Much greater control flow integrity, e.g.:
  Function index integrity checks
  Function signature checks
  Protected call stack
  Branch destination validity checks
  Security traps
  Invalid indices
  Indirect function signature mismatches
  Call stack overflows
  Out of bounds access checks
  Illegal arithmetic checks (e.g. overflows)

These and other security fundamentals also help increase memory safety and overall security in WASM. StarCard takes security seriously. To that end, StarCard seeks to leverage WASM on Ethereum as soon as it is available, safe math capabilities, and the aforementioned StarCard Clearinghouse architecture to enhance security protections.

Storage

For mass market use cases like games, data storage is another area for innovation in blockchain ecosystems where reading and writing data is costly and slow. Including data contextually in a transaction within a block on ledgers, such as Ethereum, carries fees but writing data for storage on a blockchain via smart contracts on Ethereum is even more expensive. As of Jul. 1, 2018, the cost of storing 1 GB of data on the Ethereum blockchain via a smart contract would exceed $5M USD. Beyond the cost of storage, reading data from blockchains can be slow, and all data is treated as persistent on the blockchain permanently, being replicated for all time across every redundant node in the network or the shard. Mass market applications, such as games, can necessitate massive storage requirements. AAA games today often exceed 10 GB in total data storage on a client machine, with 10 TB+ of data stored to represent the shared game world on centralized servers. Temporary storage of fungible data within a game can exceed terabytes of data per day, as tens of millions of users' actions update data about their characters, items, and attributes hundreds or thousands of times per day each. Solutions like StorJ, Swarm and IPFS seek to address decentralized off-chain data storage. Many off-chain data storage solutions rely on the idea of storing a hash of a particular piece of data on a public chain, such as Ethereum, thereby fixing the storage cost (due to the fixed size of the selected hash output) irrespective of the data size stored off-chain. While these solutions go a long way toward addressing data storage needs, today they are a long way from being able to handle the needs of a full-scale game.

An example embodiment of StarCard is designed to deal with the storage challenges of blockchains. StarCard's data storage and access needs are purposefully designed to be limited compared to a traditional AAA game. The artwork associated with collectible cards and items is stored, comprising a relatively small data set compared to traditional games which often store gigabytes of modeling, texture, sound and environment data. An example embodiment may store additional data regarding characteristics and attributes of users, cards and items, again comprising a relatively small data set. According to an example embodiment, updates to these data are designed such that they can often be conducted within the context of a transaction, thereby reducing the frequency and cost of such updates. Moreover, according to an example embodiment, transactions, data updates, and initial data storage are designed to happen on a sidechain, with results and state change outputs anchored frequently to the mainchain. Combining these techniques, an example embodiment of StarCard is designed to minimize data storage needs and mitigate the costs of storing, updating, and reading the data it does utilize.

In its approach to addressing scalability, security, and storage issues, StarCard is designed to be one of the first distributed ledger networks ready for true mass market adoption. StarCard's approach involves leveraging and adopting cutting-edge solutions including Plasma, Casper and WASM available in the Ethereum community whenever possible as they become available, extending existing solutions and implementing new innovations in sidechains and the StarCard Clearinghouse architecture, and designing around scalability, security and storage constraints thoughtfully when no decentralized technology solution is readily available.

Figure 1C:
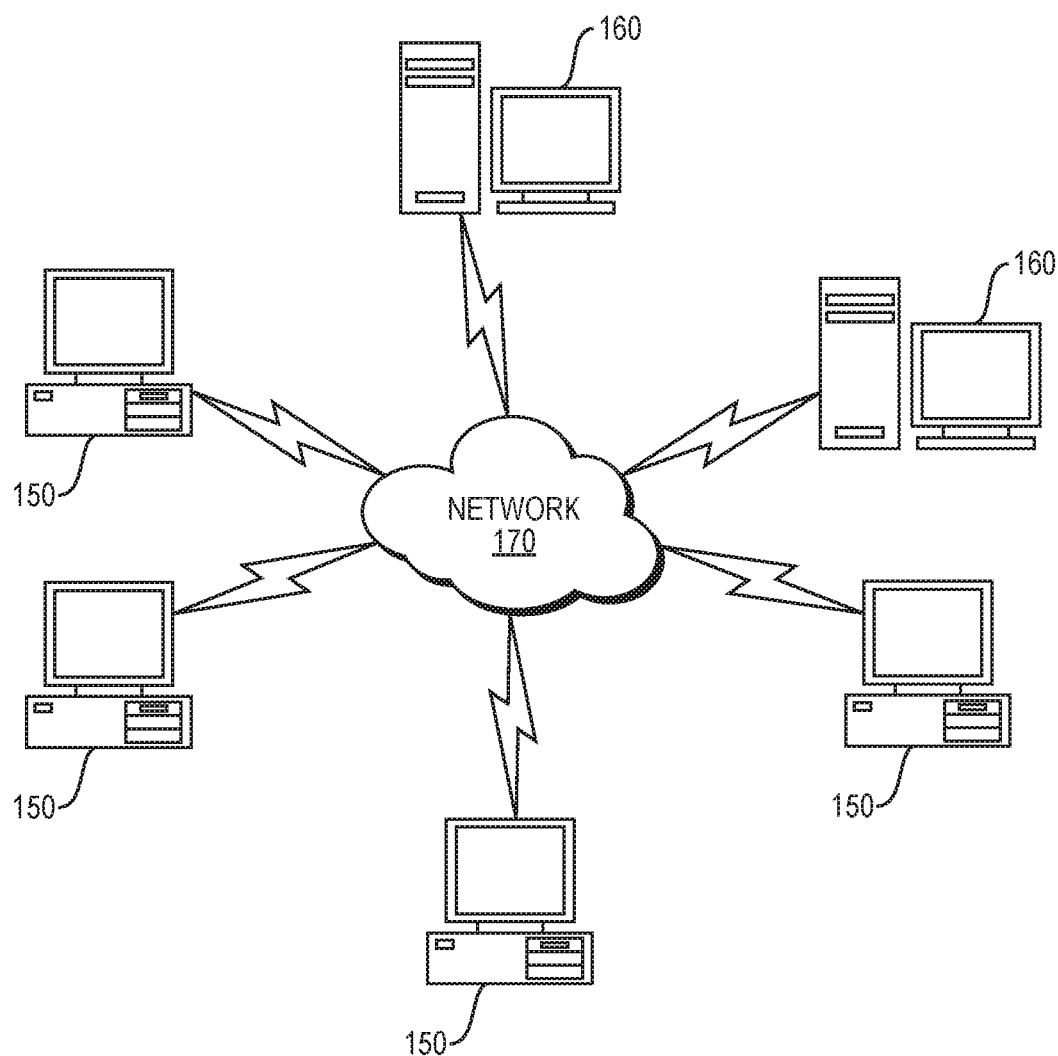
FIG. 1C is a block diagram of an example embodiment of a digital processing environment in which an example embodiment may be implemented.

FIG. 1C is a block diagram of an example digital processing environment in which an example embodiment may be implemented. Client computers/devices 150 and server computers/devices 160 provide processing, storage, and input/output devices executing application programs and the like.

Client computers/devices 150 are linked through communications network 170 to other computing devices, including other client computers/devices 150 and server computer(s) 160. The network 170 can be part of a remote access network, a global network (e.g., the Internet), a worldwide collection of computers, Local area or Wide area networks, and gateways that may use respective protocols (e.g., TCP/IP, Bluetooth, etc.) to communicate with one another. Other electronic device/computer network architectures are suitable. For example, client computers/devices 150 may include nodes shown in FIG. 1A, which run user applications that enable a user to communicate with an application to determine whether a user meets a work requirement. A digital wallet may be configured on each user device 310, 320 to store tokens. Client computers 150 of the computer-implemented system 101 may be configured with a trusted execution environment (TEE) or trusted platform module (TPM), where the application may be run and the digital wallet of a user may be stored.

Server computers 160 of the computer-implemented system may be configured to include a server that that executes the application. For example, the application of the server computer 160 may determine whether a user has satisfied a work requirement and produce a determination result and pair, in computer memory, an indication of the determination result with an identifier of the user or an identifier of a digital asset of the user, such as an address of a digital wallet owned by the user. The application of the server computer 160 also facilitates a transfer of a utility token by moving the utility token to, for example, a wallet. For another example, server computers 160 or client devices 150 may comprise peer computing devices (nodes) 210, 220, 230, 240, 250, 260 of a distributed blockchain ledger 200 of FIG. 2, which use smart contracts to execute and record transactions implemented via tokens.

Figure 1D:
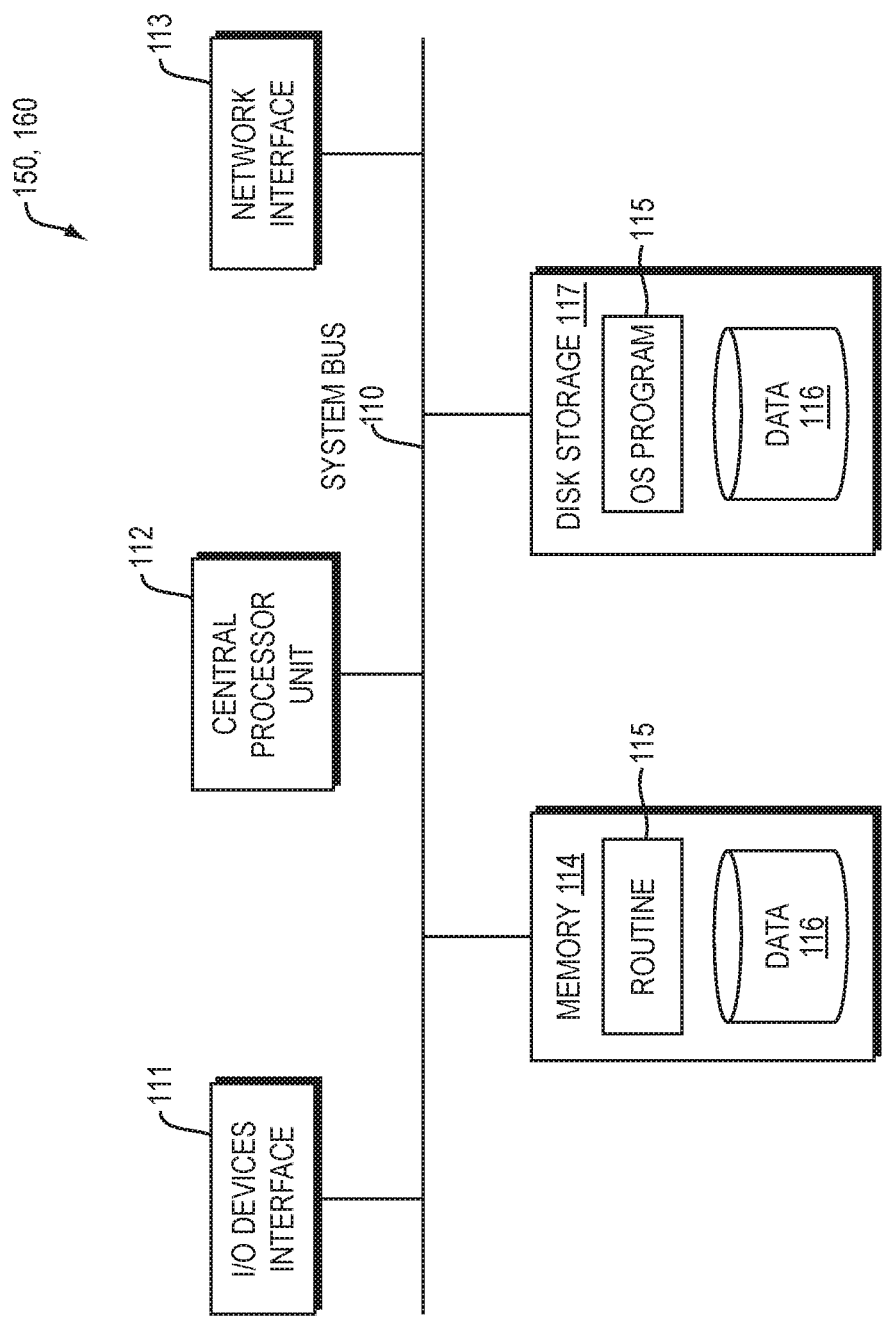
FIG. 1D is a block diagram of an example embodiment of an internal structure of a computer/computing node in the example embodiment of FIG. 1C.

FIG. 1D is a block diagram of an example embodiment of an internal structure of a computer/computing node (e.g., client processor/device/mobile phone device/tablet/video camera, or computer 150, 160) in the digital processing environment of FIG. 1C, which may be used to facilitate displaying audio, image, video or data signal information. An example embodiment may include means for displaying audio, image, video or data signal information. The computer 150, 160 in FIG. 1B may include a computer-implemented system bus 110, where a bus is a set of actual or virtual hardware lines used for data transfer among the components of a computer or processing computer-implemented system. Bus 110 is essentially a shared conduit that connects different elements of a computer computer-implemented system (e.g., processor, disk storage, memory, input/output ports, etc.) that enables the transfer of data between the elements.

Coupled to the computer-implemented system bus 110 is an I/O device interface 111 for connecting various input and output devices (e.g., keyboard, mouse, touch screen interface, displays, printers, speakers, audio inputs and outputs, video inputs and outputs, microphone jacks, etc.) to the computer 150, 160. The network interface 113 allows the computer to connect to various other devices attached to a network, such as the network 170 of FIG. 1C, disclosed above. The memory 114 provides volatile storage for computer software instructions 115 and data 116 used to implement applications and software implementations of components.

Software components 114, 115 of the computer-implemented system may be configured using any known programming language, including any high-level, object-oriented programming language. The computer-implemented system may include instances of processes that enable execution of transactions and recordation of transactions. The computer-implemented system may also include instances of a scoring engine, which can be implemented by the server 160 or a client that communicates to the server 160 using, for example, secure sockets layer (SSL), or any other suitable protocol, and computes a satisfaction score associated with a user or digital wallet or other digital asset of the user that provides a measure representing a level having satisfied a work requirement.

In an example mobile implementation, a mobile agent implementation may be provided. A client-server environment can be used to enable mobile services using a network server. It can use, for example, the Extensible Messaging and Presence Protocol (XMPP) to tether an agent 115 on the device 150 to the server 160. The server 160 can then issue commands to the mobile device on request. The mobile user interface framework used to access certain components of the computer-implemented system 101 may be based on XHP, Javelin, or WURFL. In another example mobile implementation for OS X and iOS operating computer-implemented systems and their respective APIs, Cocoa and Cocoa Touch may be used to implement the client-side components 115 using Objective-C or any other high-level programming language that adds Smalltalk-style messaging to the C programming language.

The disk storage 117 provides non-volatile storage for computer software instructions 115 (equivalently "OS program") and data 116 used to implement embodiments of the computer-implemented system. The central processor unit 112 is also coupled to the computer-implemented system bus 110 and provides for the execution of computer instructions.

According to an example embodiment, the processor routines 115 and data 116 are computer program products, e.g. application 332, smart contracts, and scoring engine (generally referenced 115), including a computer readable medium capable of being stored on a storage device 117, which provides at least a portion of the software instructions for the computer-implemented system. Executing instances of respective software components of the computer-implemented system, such as instances of the application, smart contracts, and scoring engine may be implemented as computer program products 115, and can be installed by any suitable software installation procedure, as is well known in the art. In another example embodiment, at least a portion of the computer-implemented system software instructions 115 may also be downloaded over a cable, communication and/or wireless connection via, for example, a browser SSL session or through an app (whether executed from a mobile or other computing device). According to another example embodiment, the computer-implemented system software components 115 may be implemented as a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may provide at least a portion of the software instructions for the computer-implemented system.

An example embodiment includes device code executed in the TEE or TPM. The TEE or TPM is a hardware environment that runs instructions and stores data outside the main operating computer-implemented system (OS) of a device. This protects sensitive code and data from malware or snooping with purpose-built hardware governed by an ecocomputer-implemented system of endorsements, beginning with the device manufacturer. The computer-implemented system may perform checks on the TEE or TPM, such as executing BIOS checks, to verify that the folders (e.g., wallets) stored in the TEE/TPM have not been altered by malicious actors.

Figure 2:
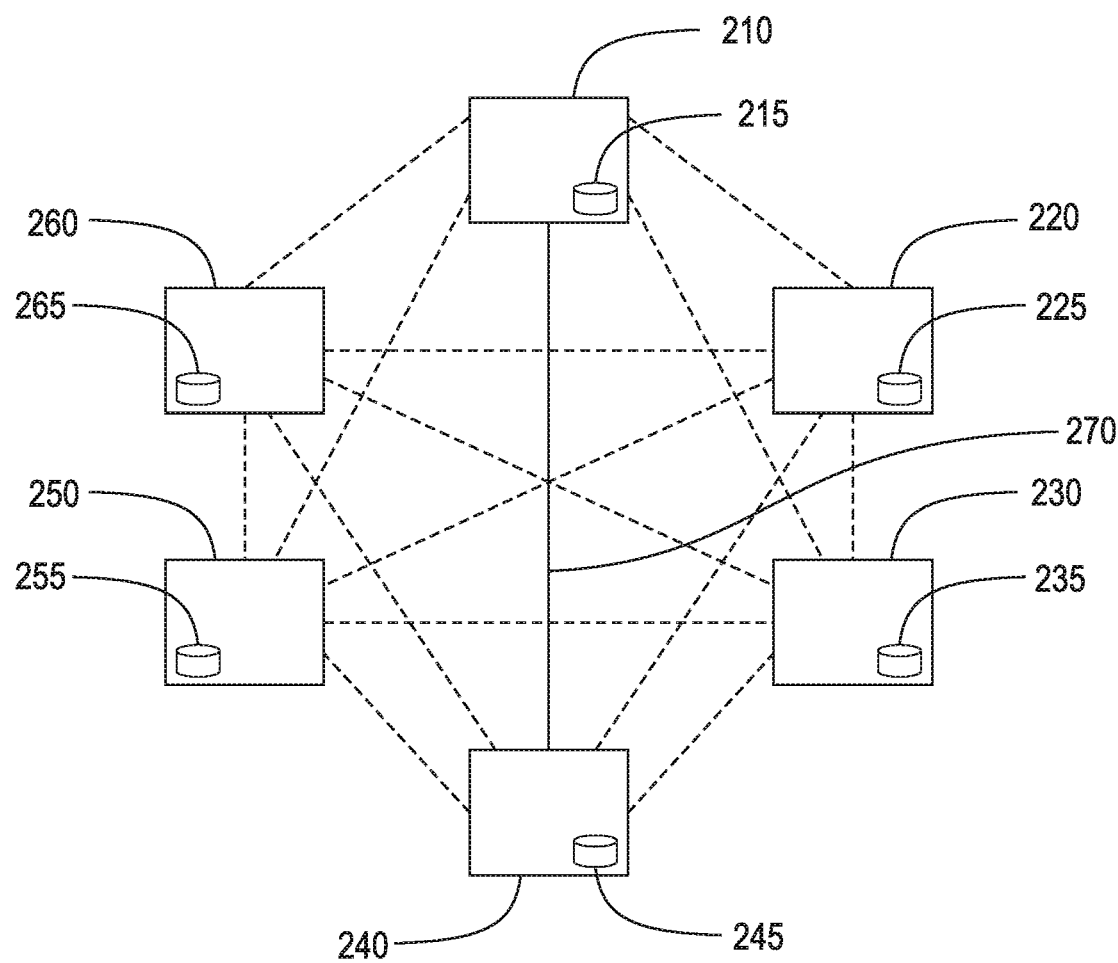
FIG. 2 is a block diagram of an example embodiment of a distributed blockchain ledger computer-implemented system.

FIG. 2 is a block diagram of an example embodiment of a blockchain network 200 that may be accessed according to an example embodiment. The blockchain network 200 may be employed as the blockchain network 100 of FIG. 1A, disclosed above. The blockchain network 200 is a distributed ledger peer-to-peer network and is valuable because this network enables trustworthy processing and recording of transactions without the need to fully trust any user (e.g., person, entity, program, and the like) involved in the transactions, reducing the need for trusted intermediaries to facilitate the transaction. Existing applications use the distributed ledger network 200 to transfer and record, in the form of blockchain based records, movement of tokens. Such blockchain based records form a cryptographically secured backlinked list of blocks.

The distributed ledger network 200 comprises multiple computing devices configured as nodes 210, 220, 230, 240, 250, 260 of the distributed ledger network 200. Each node 210, 220, 230, 240, 250, 260 locally stores and maintains a respective identical copy 215, 225, 235, 245, 255, 265 of the blockchain ledger in memory communicatively coupled to the node. The nodes exchange messages within in the distributed ledger network 200 to update and synchronize the ledger stored and maintained by each node. The nodes may also execute decentralized applications (e.g., via smart contracts) for processing the messages. A message transmission 270 from node 210 to node 240 may be used to exchange a token in the distributed ledger network 200 as shown in FIG. 2. The dotted lines between each set of nodes in the distributed ledger network 200 indicate similar transmissions that may be exchanged between any other set of nodes in the distributed ledger network 200. The messages may include a confirmed transfer for recording data associated with the token being transferred, a blockchain public key for each of the one or more parties participating in the transfer (e.g., buyer and seller), and such.

In an event it is determined that a user meets a work requirement, an application may be configured to cause the computer-implemented system to accept a given utility token. To accept the given digital token, the computer-implemented system may be further caused to permit an exchange of the given utility token, permit storage of the utility digital token, or a combination thereof. In an event it is determined that the user does not meet the work requirement, the application may be further configured to cause the computer-implemented system to reject the utility token. To reject the utility token, the computer-implemented system may be further caused to prevent the exchange of the given utility token, prevent storage of the given utility token, or a combination thereof.

Turning back to FIG. 1A, the system 101, that is, a computer-implemented system, may be caused to write a result of the determining as a determination result to the blockchain network 100. To determine whether a user has met the work requirement, the computer-implemented system 101 may be caused to check a wallet, check a network of a plurality of wallets, check entries in the blockchain network 100, or a combination thereof. According to an example embodiment, an application may be configured to cause the computer-implemented system to notify the user of the determination result.

According to an example embodiment, the utility token 118 may be a digital asset that may be a digital representation of a physical asset. For example, the utility token 118 may represent a fungible, tradable good, such as currency, reward points, gift certificates, etc. Alternatively, the utility token 118 may represent a digital asset that is non-fungible.

Further example embodiments disclosed herein may be configured using a computer program product; for example, controls may be programmed in software for implementing example embodiments. Further example embodiments may include a non-transitory computer-readable medium containing instructions that may be executed by a processor which, when loaded and executed, cause the processor to complete methods described herein. It should be understood that elements of the block and flow diagrams may be implemented in software or hardware, such as via one or more arrangements of circuitry of FIG. 1D, disclosed above, or equivalents thereof, firmware, a combination thereof, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

While example embodiments have been particularly shown and described, it will be understood by those skilled in the art that various changes in form and details may be made therein without departing from the scope of the embodiments encompassed by the appended claims.

What is claimed is:

1. A blockchain computer system, the blockchain computer system comprising:
    a blockchain gaming computer network configured as a mainchain including a distributed electronic ledger having a cryptographically secured backlinked list of interconnected blocks, the mainchain having a plurality of computing nodes with respective computer processors executing in a peer-to-peer network, the blockchain gaming computing network enabling a plurality of decentralized blockchain based games and non-fungible tokens configured to enable state changes;
    at least a portion of the plurality of computing nodes in the mainchain configured to execute at least a portion of instances of one or more of the plurality of decentralized games within the blockchain gaming computing network;
    at least one node of the plurality of nodes, in the blockchain gaming computing network, configured to interface with a plurality of sidechains computationally anchored to the mainchain;
    the plurality of sidechains implemented using a plurality of computing sidechain nodes executing in parallel to the plurality of computing nodes of the mainchain;
    the plurality of sidechains further configured to store and execute data referenced in the electronic ledger of the mainchain including images and state change outputs associated with the non-fungible tokens and decentralized blockchain based games in order to minimize data storage requirements of the mainchain and enhance scalability of the mainchain;
    the plurality of sidechains handling validation of the blocks in the distributed electronic ledger of the mainchain through a proof of authority (PoA) consensus protocol, such that the plurality of sidechains handling of validation of the blocks in the mainchain enables enhanced scalability, increased transaction throughput, and decreased latency via offsetting processing load from the mainchain and implementing the proof of authority (PoA) consensus protocol to validate the blocks in the mainchain;
    wherein at least one of sidechain nodes causes a change of state of a locked non-fungible token to be recorded in the electronic ledger of the mainchain through a validation process via the proof of authority (PoA) consensus protocol in response to processing of a smart contract executable script of the locked non-fungible token, the processing of the smart contract causing a computational attestation of completion of a work requirement by a first node in the blockchain gaming computing network; and
    wherein the unlocking of the locked electronic utility token enables the first node in the blockchain gaming computing network access to resources in the blockchain gaming computing network.

2. The blockchain computer system of claim 1, wherein blockchain gaming computing network further includes:
    the first node of the plurality of nodes in the blockchain gaming computing network, wherein the first node has a memory, the first node memory configured to execute a first digital wallet storing the locked non-fungible token;
    the first node configured to perform computational work in the blockchain gaming computing network, where the computational work completed by the first node is recorded in the distributed ledger of the mainchain;
    wherein the at least one node of the plurality of nodes executing the blockchain smart contract of the locked non-fungible token verifies whether a threshold time participation level is met by the computational work performed by the first node.

3. The blockchain computer system of claim 2, wherein the blockchain gaming computing network further includes:
    a second node of the plurality of nodes in the blockchain gaming computing network, wherein the second node has a memory, the second node memory configured to execute a second digital wallet;
    the first node of the plurality of nodes in the blockchain gaming computing network transmitting the locked electronic non-fungible token to the second node wallet, where the transmission of the locked non-fungible token completed by the first node is recorded in the distributed ledger of the blockchain gaming computing network;
    the second node configured to perform computational work in the blockchain gaming computing network, where the computational work completed by the first node is recorded in the distributed ledger of the blockchain gaming computing network; and
    wherein the at least one node of the plurality of nodes executing the blockchain smart contract of the locked non-fungible token verifies whether the threshold time participation level is met by the computational work performed by the first node and second nodes.

4. The blockchain computer system of claim 2, wherein the locked non-fungible token is configured to represent ownership of a collectible digital gaming asset, and wherein the threshold time participation level is partially met if the first node of the plurality of nodes satisfies at least one consumptive use.

5. The blockchain computer system of claim 2, wherein the participation includes participation while the at least one node is in possession of a utility token.

6. The blockchain computer system of claim 2, wherein the participation includes referencing at least one address that identifies a network resource accessible by the at least one node via the blockchain gaming computing network.

7. The blockchain computer system of claim 1, further comprising a third node of the plurality of nodes having a memory, the memory configured to store a digital wallet associated with the third node of the plurality of nodes and wherein, to determine whether the third node has satisfied the computational work function, such that the computational work function of a locked non-fungible token assigned to at least one third node is attested to including:
    the at least one node of the plurality of nodes configured to identify at least one attestation stored on the blockchain gaming computing network, the at least one attestation associated with the third node digital wallet; and
    wherein the at least one node is further configured to employ a blockchain smart contract to identify the at least one attestation.

8. The blockchain computer system of claim 7, wherein the at least one attestation includes an anti-money laundering (AML) type attestation or a know your customer (KYC) security type attestation.

9. The blockchain computer system of claim 7, wherein the at least one attestation attests to an amount of time spent, by the third node, streaming digital content over the blockchain gaming computing network.

10. The blockchain computer system of claim 1, wherein the blockchain-based game includes a utility token and wherein the transaction includes activation or trade of the utility token.

11. The blockchain computer system of claim 1, wherein the at least one sidechain node is configured to divert processing of the smart contract of the locked non-fungible token to the sidechain plurality of nodes via a WebAssembly (WASM) binary instruction application programming interface to increase security and memory safety during the smart contract execution process.

12. The blockchain computer system of claim 1, wherein the at least one sidechain node is configured to divert processing of the smart contract of the locked non-fungible token to the sidechain plurality of nodes wherein at least one of the plurality of nodes uses a trusted execution environment (TEE) to process instructions from the smart contract and increase security and memory safety during the smart contract execution process.

13. The blockchain computer system of claim 12 wherein the sidechain is further configured to minimize storage requirements and challenges of the mainchain by diverting data storage and access requests from the mainchain to the sidechain including modeling, texture, sound and environment data associated with at least one of: any non-fungible tokens or the plurality of decentralized games.

14. The blockchain computer system of claim 1, wherein the sidechain is further configured to minimize storage requirements and challenges of the mainchain by diverting data storage and access needs from the mainchain to the sidechain.

15. A blockchain computer system comprising:
a plurality of computing nodes operating to create a mainchain blockchain based network, the mainchain blockchain based network being anchored to a plurality of childchain blockchain networks;
the mainchain including a distributed electronic ledger having a cryptographically secured backlinked list of interconnected blocks, the mainchain having a plurality of computing nodes with respective computer processors executing in a peer-to-peer network, the blockchain computer system enabling a plurality of decentralized blockchain based games and non-fungible tokens configured to enable state changes;
at least a portion of the plurality of computing nodes in the mainchain configured to execute at least a portion of instances of one or more of the plurality of decentralized games within the blockchain computer system;
at least one node of the plurality of nodes, in the blockchain computer system, configured to interface with the plurality of childchains computationally anchored to the mainchain;
the plurality of childchains implemented using a plurality of computing child nodes executing in parallel to the plurality of computing nodes of the mainchain;
the childchains further configured to store and execute data referenced in the electronic ledger of the mainchain including images and state change outputs associated with the non-fungible tokens and decentralized blockchain based games in order to minimize data storage requirements of the mainchain and enhance scalability of the mainchain;
the childchains handling validation of the blocks in the distributed electronic ledger of the mainchain through a proof of authority (PoA) consensus protocol, such that the childchains improving handling of validation of blocks in the mainchain by enhancing scalability, increasing transaction throughput, and decreasing latency via the proof of authority (PoA) consensus protocol;
wherein at least one of child nodes causes a change of state of a locked non-fungible token to be recorded in the electronic ledger of the mainchain through a validation process via the proof of authority (PoA) consensus protocol in response to processing of a smart contract executable script of the locked non-fungible token, the processing of the smart contract causing a computational attestation of completion of a work requirement by a first node in the blockchain computer system; and
wherein the unlocking of the locked electronic utility token enables the first node in the blockchain computer system access to resources in the blockchain computer system.

* * * * *